UNITED STATES PATENT OFFICE.

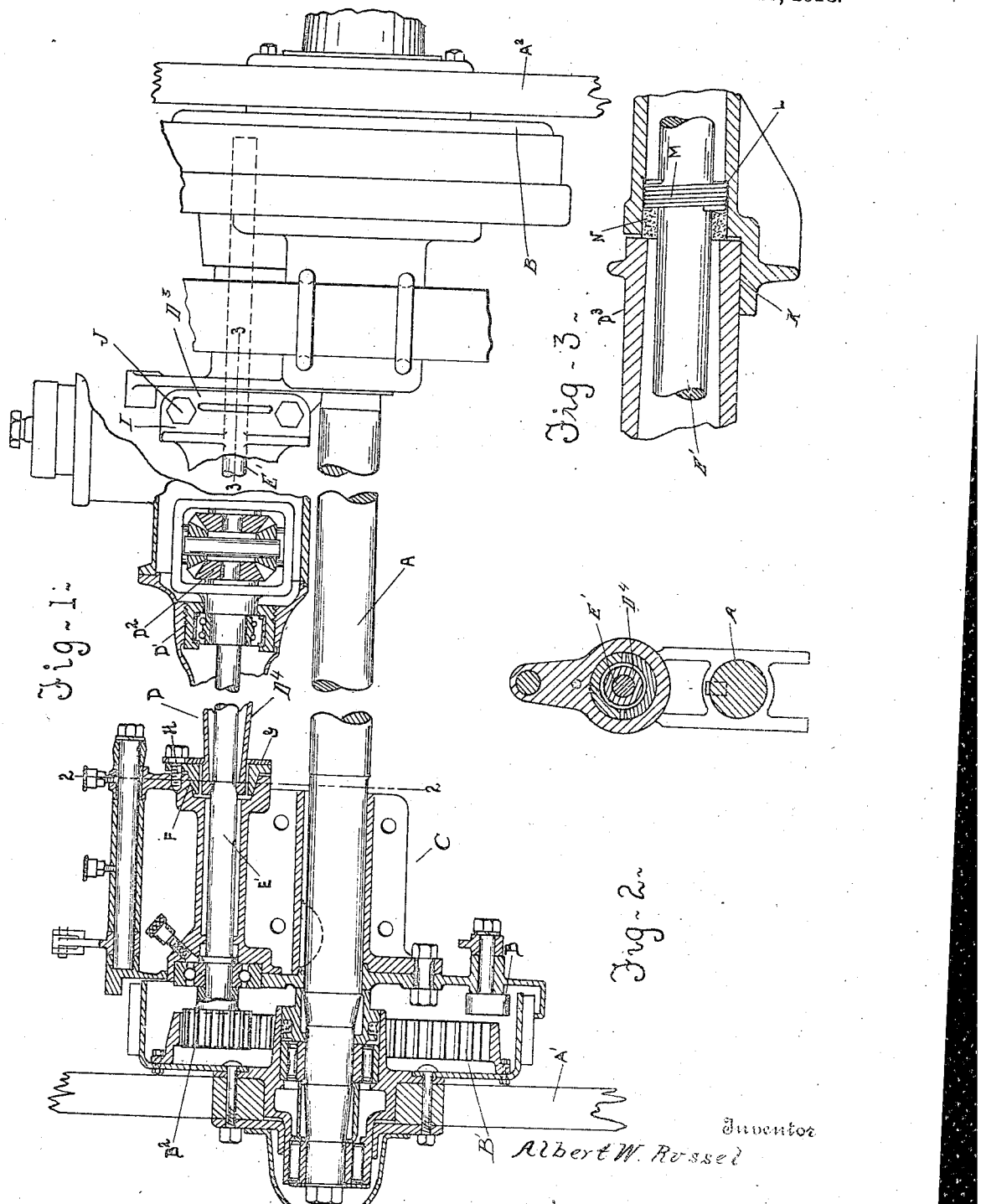

ALBERT W. RUSSEL, OF DETROIT, MICHIGAN, ASSIGNOR TO RUSSEL MOTOR AXLE COMPANY, OF DETROIT, MICHIGAN, A CORPORATION OF MICHIGAN.

REAR AXLE.

1,258,946.　　　　Specification of Letters Patent.　　Patented Mar. 12, 1918.

Application filed August 26, 1916. Serial No. 117,059.

*To all whom it may concern:*

Be it known that I, ALBERT W. RUSSEL, a citizen of the United States of America, residing at Detroit, in the county of Wayne and State of Michigan, have invented certain new and useful Improvements in Rear Axles, of which the following is a specification, reference being had therein to the accompanying drawings.

The invention relates to rear axles and more especially to rear axles of the internal gear type, which construction consists of the combination of a dead non-rotating axle for carrying the load and a power transmitting jack shaft assembly, comprising drive shafts provided with pinions which engage and mesh with internal gears attached to the wheel hubs.

In prior constructions of this type it has been usual to attach the gear and differential housing of the jack shaft assembly to the center of the load carrying axle and to support the outer ends of the jack shaft assembly in the brake and gear housing outside the springs. Great difficulty has been experienced in supporting the jack shaft assembly in this manner because of the fact that the dead axle is subject to deflection and vibrations at the center, which are transmitted to the jack shaft and cause breakages and misalinement.

It is the object of the invention to do away with the connection of the centers of the jack shaft assembly and the dead axle. It is another object of the invention to support the jack shaft in the spring supports on the dead axle at a point inside the springs thereby obtaining the necessary strength to withstand all the stresses put upon it.

This arrangement permits of a greatly shortened jack shaft and housing which is more practical to design so that it will amply carry all strains put upon it.

In the drawings:

Figure 1 is a top plan view partly in section of the rear axle;

Fig. 2 is a cross section on the line 2—2 of Fig. 1; and

Fig. 3 is a cross section on the line 3—3 of Fig. 1.

A represents the dead non-rotating axle at opposite ends of which are rotatively mounted wheels A' and A², with brake and gear housings B adjacent thereto. Adjacent to these brake and gear housings are located spring supports C to which the springs for supporting the vehicle body are secured.

D represents the jack shaft housing provided with an enlargement or housing D' containing suitable drive mechanism D², including the differential and other necessary gears. The jack shaft comprising live shafts E, extends between the driving mechanism D² and the internal gears B' inclosed within the brake and gear housings B, said live shafts having pinions B² for engaging and meshing with gears B'.

In operation the live shafts E, driven by the driving mechanism D², drive the wheels A' and A² mounted on the dead axle A through the intermeshing gears B' and B².

For the purpose of properly supporting the jack shaft housing B to withstand the stresses to which it is subjected, such as those due to the rotation of the live shafts and the intermeshing gears and the weight of the jack shaft housing, live shafts and their driving mechanism, the housing is supported in the spring supports C at a point inside the springs, there being no intermediate points of support with the main axle, the one end D³ of the housing being non-rotatably supported and the other end D⁴ being rotatively supported to permit of rotation and limited rocking. The jack shaft housing at one end D³ is provided with laterally extending lugs or ears I adapted to rest upon the spring support C. Stud bolts J passing through these lugs or ears threadedly engage the spring support for clamping the housing to the spring support. The jack shaft housing at its other end D⁴ is rotatively retained in its spring support C by means of a two-part tapering bearing F surrounding the end of the housing, this bearing being adapted to adjust the amount of play between the housing and the bearing. The collar G secured by stud bolts H retains the tapering bearing in place.

In assembling, the dead axle, wheels, brake and gear housings and spring supports are first assembled. Then one end of the jack shaft housing which is of a length to be inserted between the spring supports is inserted into the tapering bearing F and the other end is swung into its seat K in its corresponding spring supports after which the bolts J clamping the jack shaft housing to its seat K are secured in place in the spring support.

As shown in Fig. 3 a simple and efficient means is provided for packing the jack shaft within the end $D^3$ of its housing. The spring support C is slightly recessed at its inner end to provide a shoulder L, the diameter of the recess being slightly greater than the inner diameter of the jack shaft housing D. The packing N within the recess is yieldably held against the jack shaft, the end of jack shaft housing D and the wall of the recess by means of a coil spring M abutting against the shoulder L.

What I claim as my invention is:

1. In a rear axle, the combination with the dead or load carrying axle, of a jack-shaft housing supported at its ends, there being no intermediate points of support of said housing and axle and means for respectively non-rotatively and rotatively securing the opposite ends of said housing.

2. In a rear axle, the combination with the dead or load carrying axle, of a jack-shaft housing, means for non-rotatively securing one end of said housing, and means for rotatively securing the opposite end thereof.

3. In a rear axle, the combination with the load carrying axle and means for supporting the springs near opposite ends thereof, of a jack-shaft housing insertible between said supporting means and between the points of support of the springs and supported by said supporting means.

4. In a rear axle, the combination with the dead or load carrying axle and spring supports near opposite ends thereof, of a jack-shaft housing insertible between said spring supports, said spring supports provided with means for non-rotatively engaging one end of the housing and with means for rotatively engaging the opposite end.

5. In a rear axle, the combination with the dead or load carrying axle, and spring supporting means near opposite ends thereof, of a jack-shaft housing having one end longitudinally insertible into one of said spring supporting means and the opposite end laterally movable into said other spring supporting means.

6. In a rear axle, the combination with the dead or load carrying axle, of a jack-shaft housing, means for non-rotatively securing one end of said housing, means for rotatively securing the opposite end thereof, and means for compensating for play at said last-mentioned end.

7. In a rear axle, the combination with the dead or load carrying axle and spring supports at opposite ends thereof, of a jack-shaft housing between said spring supports and a jack-shaft extending therethrough and into said spring supports, one of said spring supports having a recess at its inner end concentric with said jack-shaft, the diameter of the recess being greater than the inner diameter of said jack-shaft housing, and packing within said recess yieldably held against said jack-shaft, jack-shaft housing and the wall of the recess.

8. In a rear axle, the combination with the dead or load carrying axle and spring supporting means near opposite ends thereof, of a jack-shaft housing insertible between said spring supporting means, said housing being provided with laterally extending lugs or ears, and bolts passing through said lugs or ears for securing the same to the housing.

9. In a rear axle, the combination with the dead or load carrying axle, and spring supporting means, of a jack shaft housing provided with laterally extending lugs or ears at one end thereof, means securing said lugs or ears to said spring supporting means, means for rotatively securing the opposite end of said jack shaft housing to said spring supporting means and an adjustable bearing for compensating for play at said last mentioned end.

10. In a rear axle, the combination with a load carrying axle, of spring supports mounted thereupon, a jack shaft housing, and means extending laterally from said spring supports for supporting said housing, the latter being insertible between said supporting means.

11. In a rear axle, the combination with a load carrying axle, of a jack shaft housing, and spring supports mounted upon said axle provided with laterally extending portions for engaging and supporting said housing, the latter being insertible between said extensions.

12. In a rear axle, the combination with a dead or load carrying axle, of spring supports mounted thereupon and a jack shaft housing carried upon said spring supports at points inside the points of attachment of the spring supports with the springs.

In testimony whereof I affix my signature.

ALBERT W. RUSSEL.